US008275510B2

(12) United States Patent
Tanaka et al.

(10) Patent No.: US 8,275,510 B2
(45) Date of Patent: Sep. 25, 2012

(54) FAILURE DETERMINING DEVICE AND FAILURE DETERMINING METHOD OF CONTINUOUSLY VARIABLE TRANSMISSION

(75) Inventors: Naoto Tanaka, Okazaki (JP); Shinya Toyoda, Nisshin (JP); Naoya Inoue, Nagoya (JP); Tadashi Tamura, Aichi-ken (JP); Akira Hino, Toyota (JP); Yasunari Matsui, Okazaki (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 422 days.

(21) Appl. No.: 12/670,470

(22) PCT Filed: Jul. 25, 2008

(86) PCT No.: PCT/JP2008/063829
§ 371 (c)(1),
(2), (4) Date: Feb. 23, 2010

(87) PCT Pub. No.: WO2009/017216
PCT Pub. Date: Feb. 5, 2009

(65) Prior Publication Data
US 2010/0191407 A1 Jul. 29, 2010

(30) Foreign Application Priority Data
Jul. 27, 2007 (JP) ................................. 2007-195774

(51) Int. Cl.
*G06F 19/00* (2011.01)
(52) U.S. Cl. ..................... 701/31.4; 701/29.1; 701/29.2; 477/45; 477/48; 477/28; 475/208; 475/214

(58) Field of Classification Search ................. 701/29.1, 701/29.2, 31.4; 477/45, 48, 28; 475/208, 475/214
See application file for complete search history.

(56) References Cited

U.S. PATENT DOCUMENTS 5,157,992 A * 10/1992 Hayashi et al. ................. 477/40
6,155,396 A * 12/2000 Tsubata et al. ............. 192/85.63
(Continued)

FOREIGN PATENT DOCUMENTS
JP      A-8-127261      5/1996
(Continued)

OTHER PUBLICATIONS

Dec. 2, 2008 Written Opinion issued in PCT/JP2008/063829 (with translation).

(Continued)

*Primary Examiner* — Thomas Black
*Assistant Examiner* — Wae Louie
(74) *Attorney, Agent, or Firm* — Oliff & Berridge, PLC

(57) ABSTRACT

An ECU executes a program including the steps of determining that a change speed solenoid is abnormal when a target speed ratio falls within a predetermined range, an upshift is recognized and the change speed solenoid is abnormal; determining that the change speed solenoid is normal when the change speed solenoid is not abnormal; determining that a belt pinch pressure solenoid is abnormal when the target speed ratio is substantially equal to a speed ratio γmin on a maximum speed-increase side and the target speed ratio is not substantially equal to an actual speed ratio; and determining that the belt pinch pressure solenoid is normal when the target speed ratio is substantially equal to the actual speed ratio.

10 Claims, 5 Drawing Sheets

U.S. PATENT DOCUMENTS

| | | | |
|---|---|---|---|
| 6,533,702 B1 * | 3/2003 | Asyama et al. | 477/45 |
| 6,749,530 B2 * | 6/2004 | Okano et al. | 474/28 |
| 7,544,140 B2 * | 6/2009 | Tabata et al. | 475/5 |
| 7,575,111 B2 * | 8/2009 | Ogata et al. | 192/3.3 |
| 7,729,837 B2 * | 6/2010 | Fujiwara et al. | 701/51 |
| 8,070,650 B2 * | 12/2011 | Ogata et al. | 477/48 |
| 2002/0021045 A1 * | 2/2002 | Hada et al. | 303/113.1 |
| 2003/0083169 A1 | 5/2003 | Iwata et al. | |
| 2006/0169036 A1 * | 8/2006 | Eguchi et al. | 73/168 |
| 2006/0276279 A1 * | 12/2006 | Suzuki | 474/8 |
| 2007/0155583 A1 * | 7/2007 | Tabata et al. | 477/37 |
| 2008/0047794 A1 * | 2/2008 | Ogata et al. | 192/3.3 |
| 2009/0264231 A1 * | 10/2009 | Ogata et al. | 474/11 |
| 2010/0191407 A1 * | 7/2010 | Tanaka et al. | 701/29 |

FOREIGN PATENT DOCUMENTS

| | | |
|---|---|---|
| JP | A-8-238951 | 9/1996 |
| JP | A-8-326855 | 12/1996 |
| JP | A-9-329228 | 12/1997 |
| JP | A-11-280886 | 10/1999 |
| JP | B2-3292968 | 6/2002 |
| JP | A-2004-251358 | 9/2004 |
| JP | A-2004-263714 | 9/2004 |
| JP | A-2006-342837 | 12/2006 |

OTHER PUBLICATIONS

Nov. 9, 2009 International Preliminary Report on Patentability issued in PCT/JP2008/063829 (with translation).

Oct. 14, 2008 Office Action issued in Japanese Patent Application No. 2007-195774 (with translation).

Mar. 3, 2009 Office Action issued in Japanese Patent Application No. 2007-195774 (with translation).

Jun. 2, 2009 Office Action issued in Japanese Patent Application No. 2007-195774 (with translation).

European Search Report issued in European Patent Application No. EP08792042.7, dated Aug. 12, 2010.

International Search Report issued in International Application No. PCT/JP2008/063829 on Dec. 2, 2008 (with translation).

\* cited by examiner

FAILURE DETERMINING DEVICE AND FAILURE DETERMINING METHOD OF CONTINUOUSLY VARIABLE TRANSMISSION

TECHNICAL FIELD

The present invention relates to a failure determining device of a hydraulic circuit of a continuously variable transmission, and particularly to a technique for precisely specifying a location of a failure.

BACKGROUND ART

An automatic transmission mounted on a vehicle has a speed change mechanism that is coupled to an engine via a torque converter or the like and has multiple power transmission paths. A belt-type Continuously Variable Transmission (CVT) is an example of such a speed change mechanism. The belt-type continuously variable transmission has a drive pulley (input shaft pulley or primary pulley) and a driven pulley (output shaft pulley or secondary pulley) each having a V-shaped pulley groove, as well as a belt wound around them. When a groove width of the pulley groove of one of the pulleys increases and simultaneously the groove width of the pulley groove of the other pulley decreases, effective radii of the belt wound around the respective pulleys continuously change so that the speed ratio can be continuously set. Each pulley is formed of a fixed sheave and a movable sheave. A hydraulic actuator arranged on a rear side of the movable sheave can axially move the movable sheave to change the speed ratio.

In the belt-type continuously variable transmission thus configured, it become difficult to perform the change operation of the speed ratio when a failure occurs in a solenoid controlling a hydraulic pressure supplied to the hydraulic actuator. In view of this, for example, Japanese Patent Laying-Open No. 8-326855 has disclosed a failure diagnosis device for an automatic transmission that can precisely perform failure diagnosis of the automatic transmission. This failure diagnosis device includes control signal constant-state sensing means for sensing a state in which a control signal is substantially constant, hydraulic pressure sensing means for sensing a controlled hydraulic pressure, and first failure diagnosis means for determining that the automatic transmission or the hydraulic pressure sensing means has a failure when the control signal constant-state sensing means senses the control signal in the substantially constant state and the hydraulic pressure sensed by the hydraulic pressure sensing means changes to an extent equal to or larger than a predetermined extent.

The failure diagnosis device disclosed in the above publication can perform the failure diagnosis even in the state where change in speed ratio, belt slip or the like does not occur. This can increase opportunities of the diagnosis as compared with a conventional failure diagnosis device so that the failure diagnosis can be performed early, and the possibility of damage of the automatic transmission can be reduced.

However, the belt-type continuously variable transmission has a plurality of solenoids. Therefore, it is necessary to specify a location of the failure for precisely determining the failure. The failure diagnosis device disclosed in the foregoing publication merely determines the presence/absence of the failure, and no consideration is given to specific determination of the location of failure.

DISCLOSURE OF THE INVENTION

An object of the invention is to provide a failure determining device and a failure determining method of a continuously variable transmission that can precisely specify a location of a failure when change of speed ratio becomes abnormal.

According to an aspect, the invention provides a failure determining device of a continuously variable transmission mounted on a vehicle. In the continuously variable transmission includes a drive pulley, a belt is wound around drive and driven pulleys, and a speed ratio is continuously changed by changing winding radii of the belt around the pulleys. The pulleys have groove widths that can be changed by actuators supplied with a hydraulic pressure regulated by a regulator valve. The regulator valve includes a first regulator valve for regulating a hydraulic pressure supplied to the actuator of the drive pulley and a second regulator value for regulating the hydraulic pressure supplied to the actuator of the driven pulley. The failure determining device includes a sensing unit for sensing a physical quantity corresponding to a running state of the vehicle; and a determining unit connected to the sensing unit. The determining unit determines whether the first regulating valve is abnormal or not, at the time of changing speed ratio in a first region of the speed ratio, based on a degree of change of an actual speed ratio calculated based on a running state corresponding to the sensed physical quantity and the target speed ratio; and determines whether the second regulating valve is abnormal or not, at the time of changing speed ratio in a second region on a speed increase side with respect to the first region, based on the degree of change of the actual speed ratio calculated based on the running state and the target speed ratio.

According to the invention, the winding radius of the belt is changed by adjusting a balance between the hydraulic pressure supplied to the actuator of the drive pulley and the hydraulic pressure supplied to the actuator of the driven pulley. This balance is adjusted by the first and second regulator valves. For example, when the speed ratio at the time of start or the like is on the speed decease side, the hydraulic pressure supplied to the actuator of the drive pulley is lowered to reduce the winding radius of the drive pulley, and then the hydraulic pressure will be increased to increase the winding radius after the start of the vehicle. In this operation, the second regulator valve regulates the hydraulic pressure supplied to the actuator of the driven pulley according to the hydraulic pressure supplied to the actuator of the drive pulley for suppressing occurrence of belt slip. Accordingly, in the operation of speed change toward the speed increase side in the first region, the winding radius cannot be increased when the first regulator valve does not increase the hydraulic pressure supplied to the actuator of the drive pulley according to the running state, and therefore the speed change of the speed ratio cannot proceed. Therefore, the degree of change of the speed ratio lowers in the change operation of the speed ratio (e.g., a difference between the actual speed ratio and the target speed ratio increases). Thus, the occurrence of the abnormality in the first regulator valve can be determined from the determination that the degree of following of the speed ratio in the change operation of the speed ratio is low. Conversely, when the hydraulic pressure supplied to the actuator of the driven pulley does not decrease in the second region on the speed increase side with respect to the first region, the hydraulic pressure supplied to the actuator of each pulley increases so that the winding radius cannot be changed. This results in a state that the difference between the actual speed ratio and the target speed ratio does not decrease. This lowers the degree of change of the actual speed ratio with respect to the target speed ratio in the change operation of the speed ratio. Thus, the occurrence of the abnormality of the second regulator valve can be determined by determining that the degree of attaining the speed ratio is low in the change operation of the speed ratio. As described above, the fact that one of the first and second regulator valves is abnormal can be determined based on the degree of following of the speed ratio in the first region and the degree of attaining the speed ratio in the second region. Therefore, the location of the failure can be precisely specified. Accordingly, it is possible to provide the failure determining device and the failure determining method of the continuously variable transmission that can precisely specify the location of the failure when the change of the speed ratio becomes abnormal.

Preferably, the determining unit determines whether the second regulating valve is abnormal or not, when the determining unit determines that the first regulating valve is not abnormal.

According to this invention, when it is determined that the first regulating valve is abnormal in the first region, the change of the speed ratio cannot normally proceed so that the it is impossible to determine precisely whether the second regulator valve is abnormal in the second region or not. Therefore, when it is determined that the first regulating valve is not abnormal, it is determined whether the second regulator valve is abnormal or not, and thereby it is possible to determine precisely whether the second regulator valve is abnormal or not.

Further preferably, the first and second regions do not overlap together, and allow the change of the speed ratio when the second regulating valve is abnormal.

According to this invention, the first and second regions not overlap together, whereby the abnormality determination of the first regulator valve and that of the second regulator valve can be executed in different time regions, respectively. Thereby, it is possible to determine precisely whether the first or second regulator valve is abnormal or not.

Further preferably, the determining unit determines whether the first regulating valve is abnormal or not, when the target speed ratio is set on the speed increase side with respect to the actual speed ratio based on the running state.

According to this invention, when the target speed ratio is set on the speed increase side with respect to the actual speed ratio based on the running state, it is determined whether the first regulating valve is abnormal or not. When the target speed ratio is set on the speed increase side with respect to the actual speed ratio, the hydraulic pressure supplied to the actuator of the drive pulley increases. For example, when the actual speed ratio follows the target speed ratio only to a low degree in the above situation, the hydraulic pressure supplied to the actuator of the drive pulley does not increase so that it is possible to determine precisely that the first regulator valve is abnormal.

Further preferably, the determining unit arithmetically obtains the physical quantity corresponding to the difference between the actual speed ratio and the target speed ratio based on the running state, and determines that the first regulating valve is abnormal, when the state that the arithmetically obtained difference is equal to or smaller than a predetermined value does not continue until elapsing of a predetermined time.

According to this invention, when the state that the physical quantity corresponding to the difference between the actual speed ratio and the target speed ratio (e.g., a difference in speed ratio or a difference in revolution speed of the drive pulley) is equal to or smaller than the predetermined value does not continue until the predetermined time elapses, the actual speed ratio follows the target speed ratio only to a low degree so that it is possible to determine precisely that the first regulator valve is abnormal.

Further preferably, the determining unit determines that the second regulating valve is abnormal, when the physical quantity corresponding to the difference between the target speed ratio and the speed ratio on the maximum speed-increase side is equal to or smaller than a predetermined value and the physical quantity corresponding to the difference between the target speed ratio and the actual speed ratio is larger than a predetermined value.

According to this invention, when the physical quantity corresponding to the difference between the actual speed ratio and the target speed ratio (e.g., a difference in speed ratio or a difference in revolution speed of the drive pulley) is equal to or smaller than the predetermined value and the physical quantity corresponding to the difference between the target speed ratio and the actual speed ratio is larger than a predetermined value, it is possible to determine that the actual speed ratio has not reached the speed ratio on the maximum speed-increase side. In this state, it is possible to determine that the hydraulic pressure supplied to the actuator of the driven pulley by the second regulator valve has not been decreased. Thus, it is possible to determine precisely that the second regulator valve is abnormal.

BEST MODES FOR CARRYING OUT THE INVENTION

Embodiments of the invention will now be described with reference to the drawings. In the following description, the same parts bear the same reference numbers and the same names, and achieve the same functions. Therefore, description thereof is not repeated.

Figure 1:
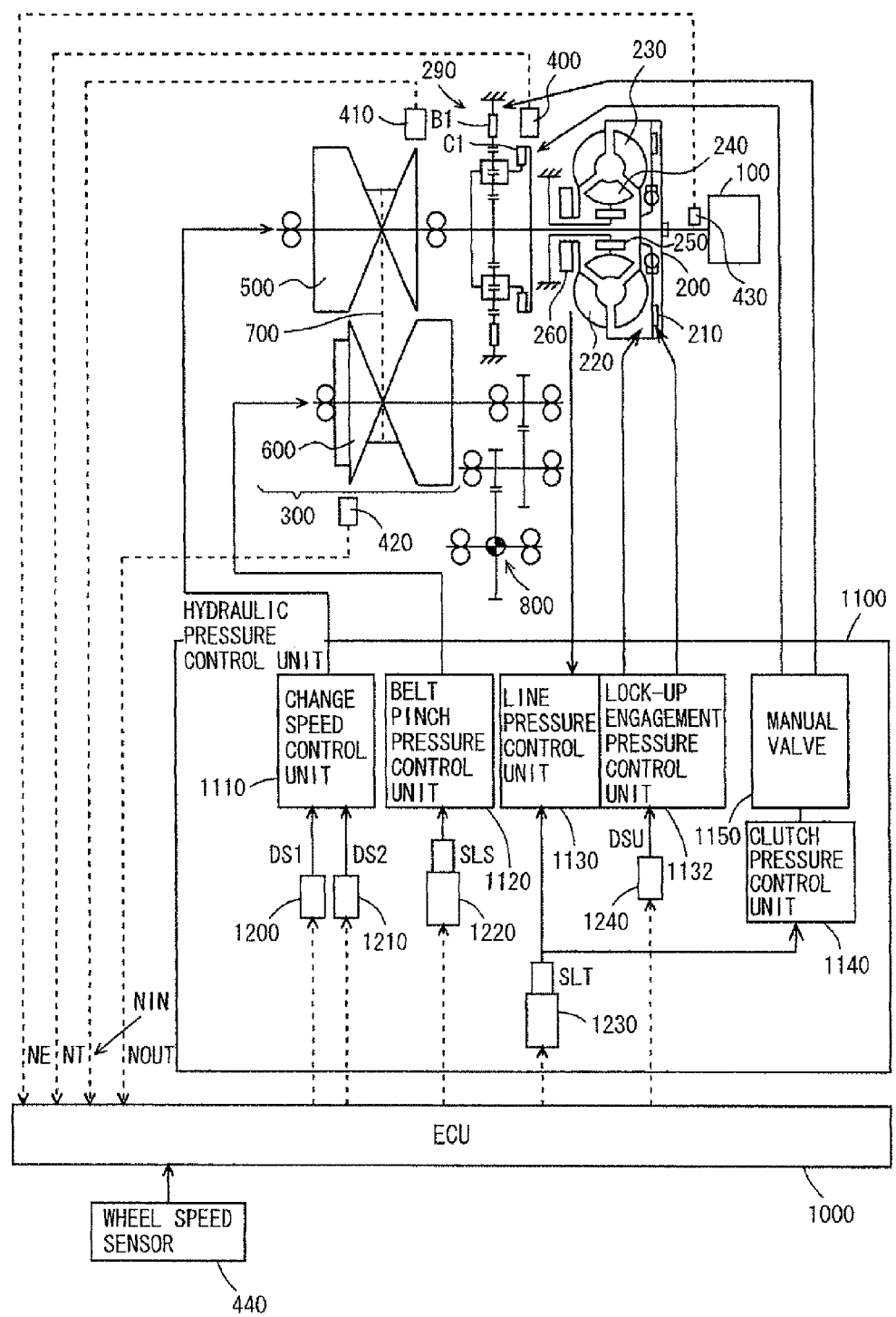
FIG. 1 is a control block diagram of a continuously variable transmission according to an embodiment.

Referring to FIG. 1, description will be given on a power train of a vehicle including a failure determining device of a continuously variable transmission according to the invention. An ECU 1000 shown in FIG. 1 implements the failure determining device of the continuously variable transmission according to the invention. The continuously variable transmission is a belt-type continuously variable transmission.

As shown in FIG. 1, the power train of the vehicle is formed of an engine 100, a torque converter 200, a forward/reverse switching device 290, a belt-type continuously variable transmission 300, a differential gear 800, ECU 1000 and a hydraulic pressure control unit 1100.

Engine 100 has an output shaft connected to an input shaft of torque converter 200. Engine 100 and torque converter 200 are coupled together through a rotation shaft. Therefore, an output shaft revolution speed NE (engine revolution speed NE) of engine 100 sensed by an engine revolution speed sensor 430 is equal to an input shaft revolution speed (pump revolution speed) of torque converter 200.

Torque converter 200 has a lock-up clutch 210 directly coupling the input and output shafts together, a pump impeller 220 on the input shaft side, a turbine runner 230 on the output shaft side, and a one-way clutch 250, and includes a stator 240 exhibiting a torque amplifying function. Torque converter 200 is connected to belt-type continuously variable transmission 300 via a rotation shaft. A turbine revolution speed sensor 400 senses an output shaft revolution speed NT (turbine revolution speed NT) of torque converter 200.

An oil pump 260 is arranged between torque converter 200 and belt-type continuously variable transmission 300. Oil pump 260 is, e.g., a gear pump, and operates with rotation of the pump impeller 220 on the input shaft side. Oil pump 260 supplies a hydraulic pressure to various solenoids of hydraulic pressure control unit 1100.

Belt-type continuously variable transmission 300 is connected to torque converter 200 via forward/reverse switching device 290. Belt-type continuously variable transmission 300 includes a primary pulley 500 on the input side, a secondary pulley 600 on the output side and a belt 700 made of metal and arranged around primary and secondary pulleys 500 and 600. Primary pulley 500 includes a stationary sheave fixed to the primary shaft and a movable sheave that is slidably and unrotatably carried by the primary shaft. Secondary pulley 600 includes a stationary sheave fixed to the secondary shaft and a movable sheave that is slidably and unrotatably carried by the secondary shaft.

A working fluid can be supplied and discharged to/from hydraulic actuators (both not shown) of primary and secondary pulleys 500 and 600. For changing the speed ratio, the groove width between the stationary and movable sheaves of each of pulleys 500 and 600 is continuously changed to increase or decrease the winding radius of the belt.

Hydraulic pressure control unit 1100 controls the hydraulic pressure supplied to the hydraulic actuator of primary pulley 500 to attain the speed ratio that achieves the revolution speed of primary pulley 500 equal to the target revolution speed. Hydraulic pressure control unit 1100 controls the hydraulic pressure supplied to the hydraulic actuator of secondary pulley 600 to push the movable sheave of secondary pulley 600 toward the stationary sheave for pinching the belt therebetween so that the belt may have a tension required for transmitting the torque.

A primary pulley revolution speed sensor 410 senses a revolution speed NIN of primary pulley 500 of belt-type continuously variable transmission 300, and a secondary pulley revolution speed sensor 420 senses a revolution speed NOUT of secondary pulley 600.

These revolution speed sensors are opposed to tooth of revolution sensing gears (i.e., gears for sensing the revolutions) attached to the rotation shafts or drive shaft connected thereto of primary and secondary pulleys 500 and 600. These revolution speed sensors can sense even minute revolutions of primary pulley 500 that is the input shaft and secondary pulley 600 that is the output shaft, and employ, e.g., magnetoresistance elements that are generally referred to as "semiconductor sensors".

Forward/reverse switching device 290 has a double pinion planetary gear, a reverse brake B1 and an input clutch C1. The planetary gear has a sun gear coupled to the input shaft, a carrier CR that carries first and second pinions P1 and P2, and is coupled to the stationary sheave on the primary side, and a ring gear R coupled to reverse brake B1 that forms a frictional engaging element for reverse drive. Input clutch C1 arranged between carrier CR and ring gear R. This input clutch C1 is also referred to as a forward clutch, and enters an engaged state whenever the vehicle in the position other than the parking (P) position, R-position and N-position runs forwardly.

Description will now be given on ECU 1000 and hydraulic pressure control unit 1100 controlling the power train described above. ECU 1000 receives a signal provided from turbine revolution speed sensor 400 and representing turbine revolution speed NT, a signal provided from primary pulley revolution speed sensor 410 and representing primary pulley revolution speed NIN, and a signal supplied from secondary pulley revolution speed sensor 420 and representing secondary pulley revolution speed NOUT.

Hydraulic pressure control unit 1100 includes a change speed control unit 1110, a belt pinch pressure control unit 1120, a line pressure control unit 1130, a lock-up engagement pressure control unit 1132, a clutch pressure control unit 1140 and a manual valve 1150. ECU 1000 provides control signals to solenoids in hydraulic pressure control unit 1100, and specifically provides the control signal to a duty solenoid (1) 1200 for controlling the change speed of the speed ratio, a duty solenoid (2) 1210 for controlling the change speed of the speed ratio, a linear solenoid 1220 for controlling the belt pinch pressure, a linear solenoid 1230 for controlling the line pressure and a duty solenoid 1240 for controlling a lock-up engagement pressure.

Change speed control unit 1110 controls the change speed of the speed ratio on an speed increase side by controlling an inflow of the working fluid to the hydraulic actuator of primary pulley 500 by duty solenoid (1) 1200 according to the vehicle speed based on the wheel speed as well as an amount of press-down of the accelerator pedal. Further, change speed control unit 1110 controls the change speed of the speed ratio on the speed reduce side by controlling the outflow of the working fluid from the hydraulic actuator of primary pulley 500 by duty solenoid (2) 1210 according to the wheel speed and the amount of press-down of the accelerator pedal. The control of the change speed is performed by controlling the inflow and outflow of the working fluid to/from the hydraulic actuator of primary pulley 500 by change speed control unit 1110.

In belt pinch pressure control unit 1120, belt pinch pressure control linear solenoid 1220 controls the hydraulic pressure supplied to the hydraulic actuator of secondary pulley 600 according to the input shaft torque of primary pulley 500 and the speed ratio, and thereby the belt pinch pressure is controlled. The input shaft torque may be estimated, e.g., from the output torque of engine 100 based on the revolution speed, intake air flow rate and the like of engine 100 and a torque ratio in torque converter 200, or may be sensed directly.

In line pressure control unit 1130, line pressure control linear solenoid 1230 controls the line pressure according to a value instructed to belt pinch pressure control linear solenoid 1220 corresponding to the belt pinch pressure and an estimated value of the hydraulic pressure supplied to the hydraulic actuator of primary pulley 500. The hydraulic pressure of primary pulley 500 is estimated based on the inflow and outflow of the working fluid flowing to/from the hydraulic actuator of primary pulley 500. The line pressure is a hydraulic pressure supplied from oil pump 260 and is regulated by a regulator valve (not shown).

In lock-up engagement pressure control unit 1132, lock-up engagement pressure control duty solenoid 1240 controls the engagement/disengagement of lock-up clutch 210, and also controls gradual increase and gradual decrease of the engagement pressure of lock-up clutch 210.

Manual valve 1150 selects the oil passage in synchronization with the driver's operation of the shift lever. Clutch pressure control unit 1140 controls the hydraulic pressure that is supplied from line pressure control linear solenoid 1230 through manual valve 1150 when input clutch C1 or reverse brake B1 is to be engaged.

ECU 1000 further receives a signal supplied from the accelerator pedal position sensor (not shown) and representing the amount of press-down of the accelerator pedal that is pressed down by the driver, a signal supplied from the throttle position sensor (not sown) and representing a degree of opening of an electromagnetic throttle, and a signal supplied from engine revolution speed sensor 430 and representing the revolution speed (NE) of engine 100.

A wheel speed sensor 440 senses the revolution speed of the wheel (not shown). Wheel speed sensor 440 transmits a wheel speed signal representing the sensed revolution speed of the wheel to ECU 1000. In this embodiment, it is merely essential to sense the vehicle speed, and it is not essential to sense the revolution speed of the wheel. For example, the vehicle speed may be arithmetically obtained based on the revolution speed of the secondary pulley and a speed reduction ratio between the continuously variable transmission and the drive wheel.

In the vehicle mounted on the continuously variable transmission described above, when the driver presses down the accelerator pedal, ECU 1000 sets the target engine output according to the vehicle speed and the amount of press-down of the accelerator pedal. ECU 1000 sets the target speed ratio (or target primary revolution speed) so that the target engine output thus may be achieved on the optimum fuel consumption line of engine 100.

When ECU 1000 sets the target speed ratio, it performs feedback control to change the actual speed ratio (i.e., speed ratio based on the ratio between the actual primary pulley revolution speed and the actual secondary pulley revolution speed) toward the target speed ratio by providing the control signals to duty solenoid (1) 1200, duty solenoid (2) 1210, belt pinch pressure control linear solenoid 1220 and line pressure control linear solenoid 1230.

For example, the speed ratio at the start of the vehicle is set to a speed ratio γmax on the maximum speed-decrease side. In this case, duty solenoid (2) 1210 performs the control to discharge the working fluid to be supplied the hydraulic actuator of primary pulley 500 so that the estimated value of the hydraulic pressure which is supplied to the hydraulic actuator of primary pulley 500 and will be referred to as a "primary pressure" hereinafter decreases. Therefore, the winding radius of belt 700 in primary pulley 500 becomes minimum.

When the primary pressure is low, it is necessary to ensure a transmission torque of belt 700. Therefore, the instructed value (which will be referred to as the "instructed value of the secondary pressure" hereinafter) provided to belt pinch pressure control linear solenoid 1220 is configured to raise the hydraulic pressure which is supplied to the hydraulic actuator of secondary pulley 600 (and will be referred to as the "secondary pressure" hereinafter) as the estimated value of the primary pressure lowers. Thus, the belt pinch pressure applied by secondary pulley 600 rises as the estimated value of the primary pressure lowers.

In the above case, the instructed value of the line pressure is set lager by a predetermined value than the instructed value of the secondary pressure for ensuring the belt pinch pressure corresponding to the instructed value of the secondary pressure.

When the vehicle speed after the start of the vehicle increases, or the amount of press-down of the accelerator pedal increases, the target speed ratio is set to a value (on the right side in FIG. 4) smaller than γmax. Duty solenoid (1) 1200 performs the control to increase the inflow of the working fluid of the hydraulic actuator so that the primary pressure rises. The rising of the primary pressure increases the winding radius of belt 700 around primary pulley 500. Further, the instructed value of the secondary pressure lowers, and the belt pinch pressure lowers. Thereby, the winding radius of belt 700 around secondary pulley 600 decreases. This decreases the speed ratio.

Figure 2:
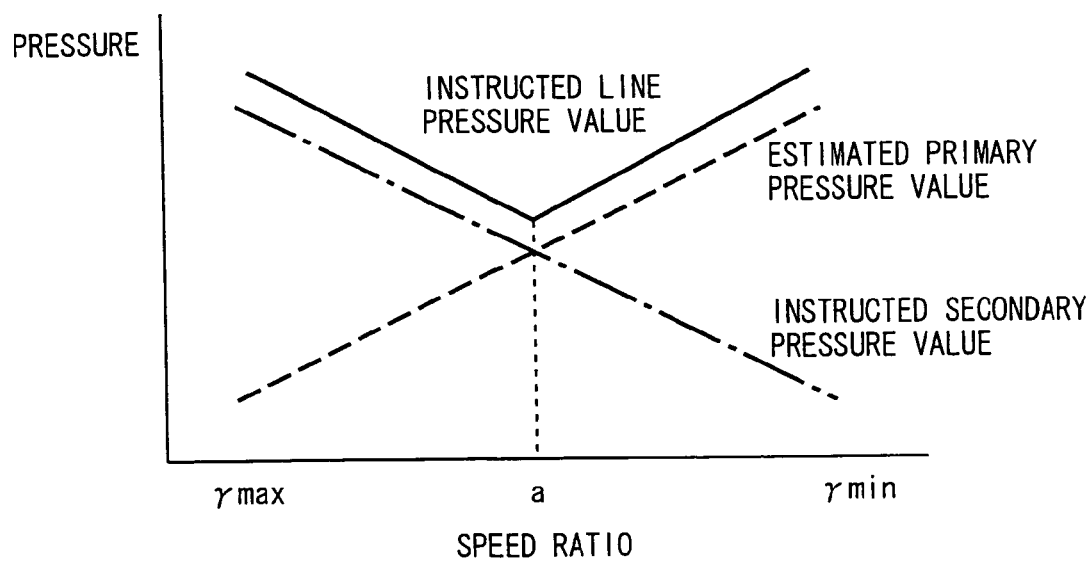
FIG. 2 shows changes in estimated value of a primary pressure with respect to a speed ratio, a specified secondary pressure value and a specified line pressure value.

In FIG. 2, the line pressure is set to a value obtained by adding a predetermined value to the instructed value of the secondary pressure, when the instructed value of the secondary pressure is in the region larger than the estimated value of the primary pressure, i.e., when the speed ratio is in the region larger than speed ratio a (the region at the left of speed ratio a in FIG. 2). Therefore, the instructed value of the line pressure lowers with lowering of the instructed value of the secondary pressure.

The primary pressure increases as the duty solenoid (1) 1200 increases the inflow to change the speed ratio toward the speed increase side. When the speed ratio enters the region of the ratio equal to or smaller than speed ratio a (i.e., the region at the right of speed ratio a in FIG. 2), the estimated value of the primary pressure becomes equal to or larger than the instructed value of the secondary pressure. The instructed value of the line pressure is equal to a sum of an estimated value of the primary pressure and a predetermined value for ensuring the primary pressure. In the region of the ratio equal to or smaller than speed ratio a, therefore, the instructed value of the line pressure increases as the primary pressure increases.

The belt-type continuously variable transmission configured to perform the control of the change speed as described above cannot change the winding radius of belt 700 and thus can not perform the change of the speed ratio without difficulty when a failure occurs in solenoid(s) (duty solenoid (1) 1200, duty solenoid (2) 1210 and/or belt pinch pressure control linear solenoid 1220) that control the hydraulic pressures supplied to the hydraulic actuators of primary and/or secondary pulleys 500 and 600. The belt-type continuously variable transmission has the plurality of solenoids as already described, and it is necessary to specify precisely the location of the failure for determining the failure more precisely.

Accordingly, the invention has the following distinctive features. In the change operation of the speed ratio in the predetermined range (1) of the speed ratio, ECU 1000 determines based on the degree of change in actual speed ratio calculated from the running state, with reference to the target speed ratio, whether an abnormality is present in duty solenoid (1) 1200 and/or duty solenoid (2) 1210 (each of which will be simply referred to as the "change speed solenoid" hereinafter) or not. In the change operation of the speed ratio in the predetermined range (2) located on the speed increase side with respect to the predetermined range (1), ECU 1000 determines based on the degree of change in actual speed ratio calculated based on the running state, with reference to the target speed, whether the abnormality is present in belt pinch pressure control linear solenoid 1220 (which will be simply referred to as the "belt pinch pressure solenoid" hereinafter) or not.

More specifically, in the predetermined range (1), at least the instructed value of the secondary pressure is larger than the estimated value of the primary pressure, and thus the speed ratio is on the speed decrease side with respect to speed ratio a. In the predetermined range (2), at least the instructed value of the secondary pressure is equal to or smaller than the estimated value of the primary pressure, and thus the speed ratio is on the speed increase side with respect to speed ratio a. The predetermined ranges (1) and (2) do not overlap each other, and at least the change of the speed ratio is allowed in these ranges even when the abnormality is present in the belt pinch pressure solenoid. The predetermined range (1) corresponds to the "first region", and the predetermined range (2) corresponds to the "second region".

When the target speed ratio is set on the speed increase side with respect to the actual speed ratio based on the running state of the vehicle, ECU 1000 determines whether the speed ratio change solenoid is abnormal or not. ECU 1000 calculates a physical quantity corresponding to the difference between the actual speed ratio and the target speed ratio based on the running state of the vehicle. Further, when the state in which the calculated difference is equal to or smaller than the predetermined value does not continue until a predetermined time elapses, ECU 1000 determines that the speed ratio change solenoid is abnormal.

According to the description of this embodiment, the running state of the vehicle is based on the vehicle speed and the amount of press-down of the accelerator pedal. However, this is not restrictive. For example, the running state may be based on the secondary pulley revolution speed and the opening degree of the throttle.

Further, ECU 1000 determines that the belt pinch pressure solenoid is abnormal when the physical quantity corresponding to the difference between the target speed ratio and the speed ratio on the maximum speed-increase side is equal to or smaller than a predetermined value and the physical quantity corresponding to the difference between the target speed ratio and the actual speed ratio is larger than a predetermined value.

The physical quantity corresponding to the difference between the target and actual speed ratios or the physical quantity corresponding to the difference between the target speed ratio and the speed ratio on the maximum speed-increase side may be the difference itself between the actual and target speed ratios, or may be the difference itself between the target speed ratio and the speed ratio on the maximum speed-decrease side. Alternatively, the above physical quantity may be obtained by calculating the difference between the target primary revolution speed and the actual primary revolution speed, or the difference between the target primary revolution speed and the primary revolution speed on the maximum speed-increase side.

Figure 3:
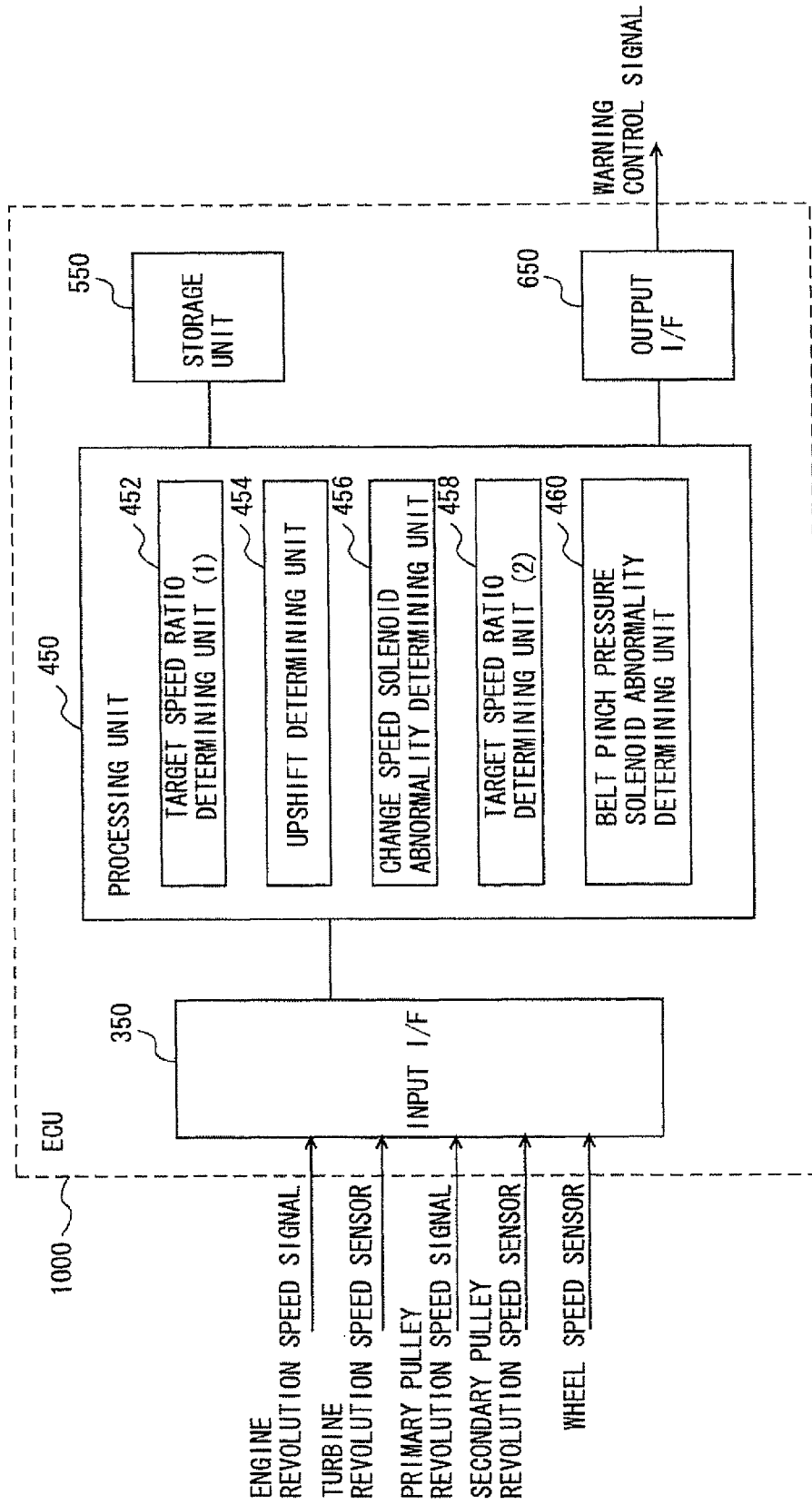
FIG. 3 is a functional block diagram of an ECU that is a failure determining device of a continuously variable transmission according to an embodiment.

FIG. 3 is a functional block diagram of ECU 1000 that is a failure determining device of the continuously variable transmission according to the embodiment. ECU 1000 includes an input interface (which will be described as an "input I/F" hereinafter) 350, a processing unit 450, a storage unit 550 and an output interface (which will be described as an "output I/F" hereinafter) 650.

Input I/F 350 receives an engine revolution speed signal provided from engine revolution speed sensor 430, a turbine revolution speed signal provided from turbine revolution speed sensor 400, a primary pulley revolution speed signal provided from primary pulley revolution speed sensor 410, a secondary pulley revolution speed signal provided from secondary pulley revolution speed sensor 420 and a wheel speed signal provided from wheel speed sensor 440, and transmits them to processing unit 450.

Processing unit 450 includes a target speed ratio determining unit (1) 452, an upshift determining unit 454, a change speed solenoid abnormality determining unit 456, a target speed ratio determining unit (2) 458 and a belt pinch pressure solenoid abnormality determining unit 460.

Target speed ratio determining unit (1) 452 determines whether the target speed ratio that is set according to the vehicle speed calculated based on the wheel speed sensed by wheel speed sensor 440 as well as the accelerator press-down degree (or the throttle opening degree) falls within the predetermined range (1) or not.

Target speed ratio determining unit (1) 452 may be configured to turn on a determination flag (1), e.g., when the set target speed ratio falls within a predetermined range (1).

Upshift determining unit 454 determines whether the upshift is to be performed or not, when the set target speed ratio falls within the predetermined range. More specifically, upshift determining unit 454 determines that the upshift is to be performed, when the actual speed ratio is smaller than the target speed ratio. Upshift determining unit 454 may be configured to perform the upshift determination when the determination flag (1) is on, and to turn on the upshift determination flag when it determines that the upshift is to be performed.

Change speed solenoid abnormality determining unit 456 determines whether the change speed solenoid is abnormal or not, when the target speed ratio falls within the predetermined range (1) and it is determined that the upshift is to be performed.

Change speed solenoid abnormality determining unit 456 determines whether the change speed solenoid is abnormal or not, based on the degree of following of the actual speed ratio with respect to the target speed ratio. More specifically, change speed solenoid abnormality determining unit 456 calculates the difference between the actual speed ratio and the target speed ratio based on the running state of the vehicle, and determines that the change speed solenoid is abnormal, when the state in which the calculated difference is equal to or smaller than a predetermined value does not continue until a predetermined time elapses.

The abnormality in the change speed solenoid is at least one of such states that the working fluid cannot flow into the hydraulic actuator of primary pulley 500 due to the off-failure of duty solenoid (2) 1210, and that the working fluid always flows out from the hydraulic actuator of primary pulley 500 due to the on-failure of duty solenoid (2) 1210. When the above state occurs, the winding radius of belt 700 around primary pulley 500 cannot be increased so that the upshift is impossible.

Change speed solenoid abnormality determining unit 456 may be configured to determine whether the change speed solenoid is abnormal or not, e.g., when both the determination flag (1) and the upshift determination flag are on, and to turn on the change speed solenoid abnormality determination flag when it determines that the change speed solenoid is abnormal.

When change speed solenoid abnormality determining unit 456 determines that the change speed solenoid is normal, target speed ratio determining unit (2) 458 determines whether the target speed ratio falls within the predetermined range (2) or not. The predetermined range (2) in this embodiment is the same as that substantially equal to speed ratio $\gamma$min of the maximum speed-increase.

More specifically, target speed ratio determining unit (2) 458 determines whether the difference between the target speed ratio and speed ratio γmin is equal to or smaller than a predetermined value or not. The "predetermined value" is not restrictive. Target speed ratio determining unit (2) 458 may be configured to turn on the determination flag (2) when the target speed ratio is substantially equal to speed ratio γmin.

When it is determined that target speed ratio is substantially equal to speed ratio γmin, pinch pressure solenoid abnormality determining unit 460 determines whether the belt pinch pressure solenoid is abnormal or not. More specifically, belt pinch pressure solenoid abnormality determining unit 460 determines whether the target speed ratio is substantially equal to the actual speed ratio or not. Thus, when the difference between the target speed ratio and the actual speed ratio is equal to or smaller than a predetermined value, pinch pressure solenoid abnormality determining unit 460 determines that the target speed ratio is substantially equal to the actual speed ratio. The predetermined value is determined by an experiment or the like, and is not particularly restrictive.

When the target speed ratio is substantially equal to the actual speed ratio, pinch pressure solenoid abnormality determining unit 460 determines that the belt pinch pressure solenoid is normal. When the target speed ratio is not substantially equal to the actual speed ratio, pinch pressure solenoid abnormality determining unit 460 determines that belt pinch pressure solenoid is abnormal.

Pinch pressure solenoid abnormality determining unit 460 may be configured to determine that the belt pinch pressure solenoid is abnormal, e.g., when a state in which the difference between the target speed ratio and the actual speed ratio is larger than a predetermined value continues until a predetermined time elapses.

Pinch pressure solenoid abnormality determining unit 460 may be configured to determine whether the pinch pressure solenoid is abnormal or not, e.g., when the change speed solenoid abnormality determination flag is on and the determination flag (2) is on.

A warning control unit (not shown) may be employed for providing a warning control signal through output I/F 650 to an warning device such as a warning lamp, a sound generator or the like in response to determination that the change speed solenoid or the belt pinch pressure solenoid is abnormal.

In the description of this embodiment, the CPU, i.e., processing unit 450 executes the program stored in storage unit 550 to implement target speed ratio determining unit (1) 452, upshift determining unit 454, change speed solenoid abnormality determining unit 456, target speed ratio determining unit (2) 458 and belt pinch pressure solenoid abnormality determining unit 460. However, these may be implemented by hardware. The above program is stored in a storage medium and thereby is kept on the vehicle.

Storage unit 550 stores various kinds of information, programs, thresholds, maps and the like, and processing unit 450 reads or stores the data when necessary.

Figure 4:
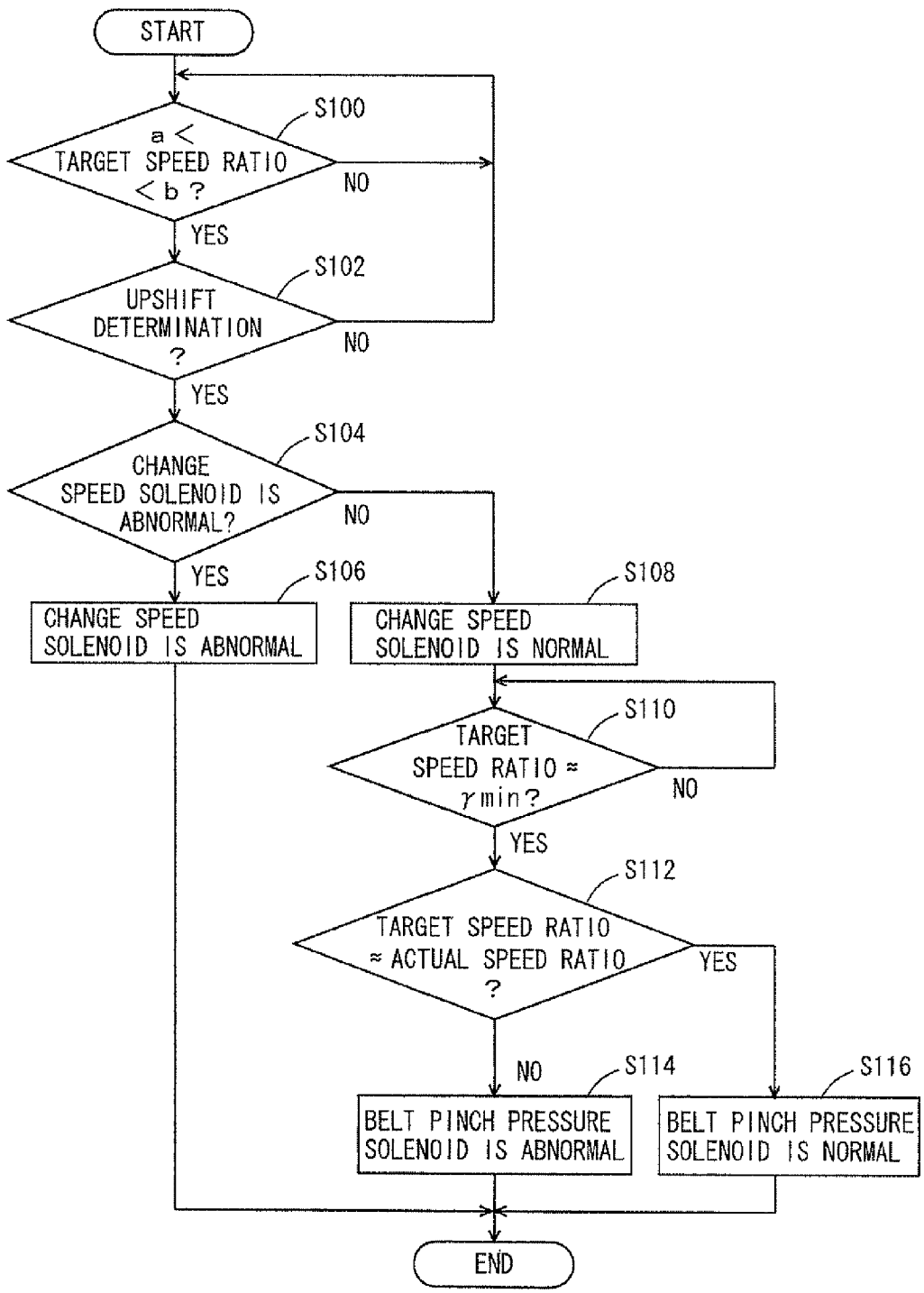
FIG. 4 is a flowchart showing a control structure of a program executed by the ECU of the failure determining device of the continuously variable transmission according to the embodiment.

Referring to FIG. 4, description will be given on the control structure of the program that is executed by ECU 1000, i.e., the failure determining device of the continuously variable transmission according to the embodiment.

In step (which will be simply referred to as "S" hereinafter) 100, ECU 1000 determines whether the target speed ratio falls within a range larger than predetermined value a and smaller than predetermined value b, or not. Predetermined value b is larger than predetermined value a. When the target speed ratio falls within the range larger than predetermined value a and smaller than predetermined value b (YES in S100), the process proceeds to S102. Otherwise (NO in S100), the process returns to S100.

In S102, ECU 1000 determines whether the upshift is to be performed or not. When the upshift is to be performed (YES in S102), the process proceeds to S104. Otherwise (NO in S102), the process returns to S100.

In S104, ECU 1000 determines whether the change speed solenoid is abnormal or not. When the change speed solenoid is abnormal (YES in S104), the process proceeds to S106. Otherwise (NO in S104), the process proceeds to S108.

In S106, ECU 1000 determines that the change speed solenoid is abnormal. In this operation, ECU 1000 may be configured to inform the driver of the abnormality in the change speed solenoid by the warning lamp, warning sound or the like. In S108, ECU 1000 determines that the change speed solenoid is normal.

In S110, ECU 1000 determines whether the target speed ratio is substantially equal to the speed ratio γmin or not. When the target speed ratio is substantially equal to speed ratio γmin (YES in S110), the process proceeds to S112. Otherwise (NO in S110), the process returns to S110.

In S112, ECU 1000 determines whether the target speed ratio is substantially equal to the actual speed ratio or not. When the target speed ratio is substantially equal to the actual speed ratio (YES in S112), the process proceeds to S116. Otherwise (NO in S112), the process returns to S114.

In S114, ECU 1000 determines that the belt pinch pressure solenoid is abnormal. ECU 1000 may be configured to inform the driver of the abnormality in the belt pinch pressure solenoid by the warning lamp, warning sound or the like. In S116, ECU 1000 determines that belt pinch pressure solenoid is normal.

Based on the structure and flowchart described above, the failure determining device of the continuously variable transmission according to the embodiment operates as follows.

When the speed ratio is larger than predetermined value a and is smaller than predetermined value b during the running of the vehicle (YES in S100), it is determined whether the change state of the speed ratio of the continuously variable transmission is currently the upshift or not (S102). When it is determined that the target speed ratio is larger than the actual speed ratio and the change state is currently the upshift (YES in S102), it is determined whether the change speed solenoid is abnormal or not (S104).

When the state in which the difference between the target and actual speed ratios is equal to or smaller than the predetermined value does not continue until the predetermined time elapses (YES in S104), it is determined that the change speed solenoid is abnormal (S106).

When the state in which the difference between the target and actual speed ratios is equal to or smaller than the predetermined value continues until the predetermined time elapses (NO in S104), it is determined that the change speed solenoid is normal (S108).

When it is determined that the change speed solenoid is normal, the target speed ratio is substantially equal to speed ratio γmin on the maximum speed-increase side (YES in S112) and the actual speed ratio is substantially equal to the target speed ratio (YES in S112), it is determined that the belt pinch pressure solenoid is normal (S116).

Figure 5:
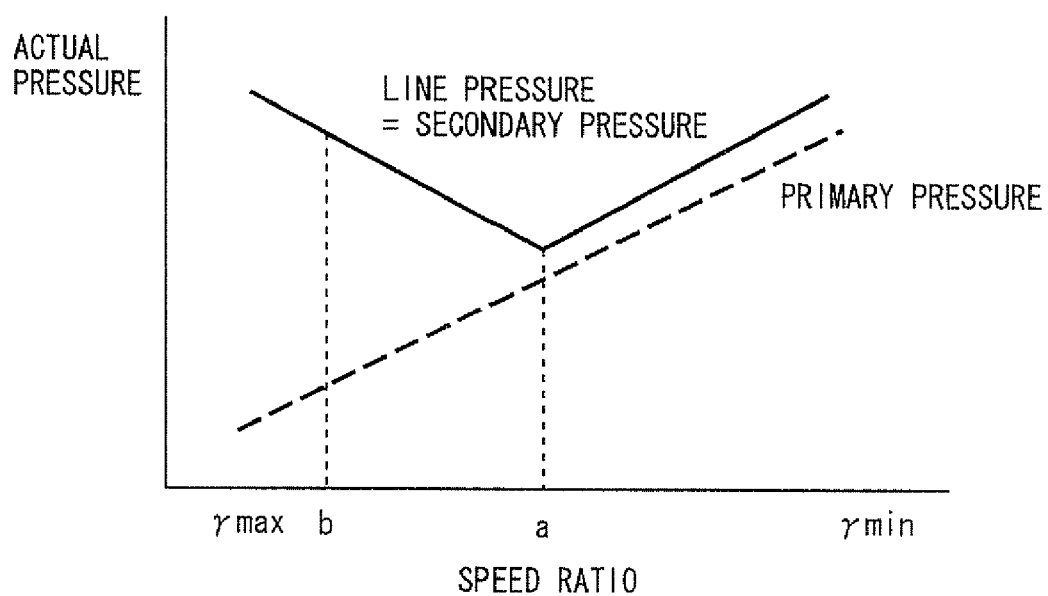
FIG. 5 shows changes in primary pressure and secondary pressure in a state where a belt pinch pressure solenoid is abnormal.

As shown in FIG. 5, when the belt pinch pressure solenoid is abnormal and thus the off-failure occurs, the secondary pressure becomes equal to the line pressure. Therefore, when the speed ratio is on the speed decrease side, e.g., for the vehicle start operation, the secondary pressure decreases with the line pressure so that the speed ratio will change toward the speed increase side.

When the speed ratio exceeds speed ratio a, both the primary pressure and secondary pressure rise so that the movable sheave in each of primary and secondary pulleys 500 and 600 tends to move in the direction that reduces the grow width. Therefore, the winding radii of primary and secondary pulleys 500 and 600 cannot change toward the speed increase side. Thereby, the transmission enters the state in which the change of the speed ratio no longer proceeds.

Therefore, even in the state where the target speed ratio is substantially equal to speed ratio γmin on the maximum speed-increase side (YES in S110), the change of the speed ratio does not proceed toward the speed increase side when the actual speed ratio is smaller than the target speed ratio (NO in S112), and therefore it is determined that the belt pinch pressure solenoid is abnormal (S114).

According to the failure determining device of the continuously variable transmission according to the embodiment, when the change of the speed ratio is to be performed with the speed ratio falling within the predetermined range (1) but the hydraulic pressure supplied to the actuator of the drive pulley by the change speed solenoid does not decrease according to the running state, the change of the speed ratio does not proceed. When the transmission enters the state in which the change of the speed ratio does not proceed, the difference between the actual and target speed ratios increases so that the degree of change of the speed ratio with reference to the target speed ratio lowers. Thus, the fact that the abnormality has occurred in the change speed solenoid can be determined by determining the fact that the degree of following of the change of the speed ratio is low in the change operation.

Conversely, when the speed ratio on the maximum speed-increase side is the target speed ratio and the hydraulic pressure supplied to the actuator of the driven pulley does not decrease, the transmission enters the state in which the difference between the actual and target speed ratios does not decrease. Thus, the transmission enters the state in which the degree of change of the actual speed ratio with reference to the target speed ratio is low. When this state occurs, it is possible to determine that the abnormality has occurred in the belt pinch pressure solenoid. As described above, it is possible to determine that either the change speed solenoid or the belt pinch pressure solenoid is abnormal, based on the degree of following of the speed ratio within the predetermined range (1) and the degree of attaining the speed ratio on the maximum speed-increase side. Therefore, the location of the failure can be precisely specified. Accordingly, it is possible to provide the failure determining device and the failure determining method of the continuously variable transmission that can precisely specify the location of the failure when abnormality occurs in the transmission.

When it is determined that the failure is present in the change speed solenoid, the change of the speed ratio does not normally proceed so that it is impossible to determine precisely whether the belt pinch pressure solenoid is abnormal or not. Therefore, when it is determined that the change speed solenoid is not abnormal, it is determined whether the belt pinch pressure solenoid is abnormal or not, and thereby it is possible to determine precisely whether the belt pinch pressure solenoid is abnormal or not.

Further, the abnormality determination for the change speed solenoid and the abnormality determination for the belt pinch pressure solenoid are executed in different time regions with the speed ratios kept in regions not overlapping together, respectively. Thereby, it is possible to determine precisely whether the change speed solenoid and the belt pinch pressure solenoid are abnormal or not.

According to the description of this embodiment, it is determined which one of the change speed solenoid and the belt pinch pressure solenoid has a failure, by executing the abnormality determination for the change speed solenoid and the abnormality determination for the belt pinch pressure solenoid in different time regions with the speed ratios kept in regions not overlapping together, respectively. However, the invention is not restricted to these solenoids. For example, the invention may be applied to two or more solenoids that supply the hydraulic pressure to actuators of two different pulleys, respectively.

Although the present invention has been described and illustrated in detail, it is clearly understood that the same is by way of illustration and example only and is not to be taken by way of limitation, the scope of the present invention being interpreted by the terms of the appended claims.

The invention claimed is:

1. A failure determining device of a continuously variable transmission mounted on a vehicle, wherein said continuously variable transmission includes a drive pulley, a driven pulley and a belt, said belt is wound around said drive and driven pulleys, a speed ratio is continuously changed by changing winding radii of said belt around said pulleys, said pulleys have groove widths being changeable by actuators supplied with a hydraulic pressure regulated by a regulator valve, and said regulator valve includes a first regulator valve for regulating a hydraulic pressure supplied to the actuator of said drive pulley and a second regulator value for regulating the hydraulic pressure supplied to the actuator of said driven pulley;

said failure determining device comprises:
a sensing unit for sensing a physical quantity corresponding to a running state of said vehicle, and
a determining unit connected to said sensing unit;
said determining unit determines whether said first regulating valve is abnormal in a region where the hydraulic pressure supplied to the actuator of said driven pulley is higher than the hydraulic pressure supplied to the actuator of said drive pulley, or not, at the time of changing speed ratio in a first region of the speed ratio based on a degree of change of an actual speed ratio calculated based on a running state corresponding to said sensed physical quantity and the target speed ratio;
said determining unit determines whether said second regulating valve is abnormal in a region where the hydraulic pressure supplied to the actuator of said driven pulley is lower than the hydraulic pressure supplied to the actuator of said drive pulley, or not, at the time of changing speed ratio change in a second region on a speed increase side with respect to said first region, based on the degree of change of the actual speed ratio calculated based on said running state and the target speed ratio; and
said first and second regions do not overlap together, and each of said first and second regions allows the change of speed ratio when said second regulating valve is abnormal.

2. The failure determining device of the continuously variable transmission according to claim 1, wherein
said determining unit determines whether said second regulating valve is abnormal or not, when said determining unit determines that said first regulating valve is not abnormal.

3. The failure determining device of the continuously variable transmission according to claim 1, wherein
said determining unit determines whether said first regulating valve is abnormal or not, when said target speed ratio is set on the speed increase side with respect to the actual speed ratio based on said running state.

4. The failure determining device of the continuously variable transmission according to claim 1, wherein said determining unit arithmetically obtains the physical quantity corresponding to the difference between said actual speed ratio and said target speed ratio based on said running state, and said determining unit determines that said first regulating valve is abnormal, when the state that said arithmetically obtained difference is equal to or smaller than a predetermined value does not continue until elapsing of a predetermined time.

5. The failure determining device of the continuously variable transmission according to claim 1, wherein said determining unit determines that said second regulating valve is abnormal, when the physical quantity corresponding to the difference between said target speed ratio and said speed ratio on the maximum speed-increase side is equal to or smaller than a predetermined value and the physical quantity corresponding to the difference between said target speed ratio and said actual speed ratio is larger than a predetermined value.

6. A failure determining method of a continuously variable transmission mounted on a vehicle, wherein said continuously variable transmission includes a drive pulley, a driven pulley and a belt, said belt is wound around said drive and driven pulleys, a speed ratio is continuously changed by changing winding radii of said belt around said pulleys, said pulleys have groove widths being changeable by actuators supplied with a hydraulic pressure regulated by a regulator valve, and said regulator valve includes a first regulator valve for regulating a hydraulic pressure supplied to the actuator of said drive pulley and a second regulator value for regulating the hydraulic pressure supplied to the actuator of said driven pulley;

said failure determining method comprises:

a sensing step of sensing a physical quantity corresponding to a running state of said vehicle;

a first determining step of determining whether said first regulating valve is abnormal or not, at the time of changing speed ratio in a first region of the speed ratio, based on a degree of change of an actual speed ratio calculated based on a running state corresponding to said sensed physical quantity and the target speed ratio; and a second determining step of determining whether said second regulating valve is abnormal or not, at the time of changing speed ratio in a second region on a speed increase side with respect to said first region based on the degree of change of the actual speed ratio calculated based on said running state and the target speed ratio;

said first determining step determines whether said first regulating valve is abnormal in a region where the hydraulic pressure supplied to the actuator of said driven pulley is higher than the hydraulic pressure supplied to the actuator of said drive pulley, or not;

said second determining step determines whether said second regulating valve is abnormal in a region where the hydraulic pressure supplied to the actuator of said driven pulley is lower than the hydraulic pressure supplied to the actuator of said drive pulley, or not; and said first and second regions do not overlap together, and each of said first and second regions allows the change of speed ratio when said second regulating valve is abnormal.

7. The failure determining method of the continuously variable transmission according to claim 6, wherein said second determining step includes a step of determining whether said second regulating valve is abnormal or not, when it is determined that said first regulating valve is not abnormal.

8. The failure determining method of the continuously variable transmission according to claim 6, wherein said first determining step includes a step of determining whether said first regulating valve is abnormal or not, when said target speed ratio is set on the speed increase side with respect to the actual speed ratio based on said running state.

9. The failure determining method of the continuously variable transmission according to claim 6, wherein said first determining step includes the steps of:

arithmetically obtaining the physical quantity corresponding to the difference between said actual speed ratio and said target speed ratio based on said running state, and determining that said first regulating valve is abnormal, when the state that said arithmetically obtained difference is equal to or smaller than a predetermined value does not continue until elapsing of a predetermined time.

10. The failure determining method of the continuously variable transmission according to claim 6, wherein said second determining unit step includes a step of determining that said second regulating valve is abnormal, when the physical quantity corresponding to the difference between said target speed ratio and said speed ratio on the maximum speed-increase side is equal to or smaller than a predetermined value and the physical quantity corresponding to the difference between said target speed ratio and said actual speed ratio is larger than a predetermined value.

* * * * *